United States Patent Office  3,009,950
Patented Nov. 21, 1961

3,009,950
PREPARATION OF 1-AMINO-1-PROPANE-
SULFONIC ACID
John H. Hennes, Lake Jackson, Tex., assignor to The
Dow Chemical Company, Midland, Mich., a corporation of Delaware
No Drawing. Filed Sept. 26, 1958, Ser. No. 763,446
4 Claims. (Cl. 260—513)

This invention relates to an organic chemical reaction, and is more particularly concerned with the synthesis of α-aminoalkylsulfonic acids.

Known procedures for the preparation of α-aminoalkylsulfonic acids require several steps and result in poor yields. In these methods the 1-aminopropanesulfonic acid could not be isolated because of its solubility in water.

I have discovered that by limiting the amount of water present, and forming ammonium bisulfite or aminoalkyl bisulfite in situ, high yields of the 1-aminoalkylsulfonic acids are obtained in one step. I have further discovered that by this process, yields up to 95 percent of 1-amino-1-propanesulfonic acid may be obtained.

In the present invention, an aliphatic aldehyde is contacted with ammonia or an aliphatic primary or secondary amine and sulfur dioxide in the presence of a $C_1$ to $C_3$ alcohol containing from about 10 to about 1 percent of water and at a pH of about 2 to about 6. The aldehyde may contain from 2 to 12 carbon atoms and a straight or branched chain, such as, for example, butyraldehyde, acetaldehyde, methylhexanals, decanal, dodecanal, isobutyraldehyde, isovaleraldehyde, undecanal, etc. The primary or secondary amine may contain from 1 to 4 carbon atoms in each alkyl group, such as, for example, methyl amine, propyl amine, butylamine, isopropylamine, di-butyl amine, di-ethylamine, etc. The alcoholic solvent may be methanol, ethanol, propanol or isopropanol. A stoichiometric excess of both the amine, or the ammonia, and the sulfur dioxide are required to form an excess of the bisulfite compound, and the sulfur dioxide is maintained in greater excess than the amine or ammonia to obtain an acidic pH, which may be from about 2 to about 6 and is preferably from about 3 to about 4. The temperature of the reaction is maintained from about 0° C. to about 90° C., preferably from about 20° C. to about 60° C., and desirably about 35° C. Reagents may be added at any rate at which the temperature of the reaction can be held in the operative range. Pressure is usually atmospheric, although other pressures may be used, if desired. Products are separated by conventional methods, such as, filtration, evaporation, etc.

The process of the present invention may be further illustrated, but is not to be construed as limited, by the following examples:

EXAMPLE I

Preparation of 1-amino-1-propanesulfonic acid

A 22 liter, five necked flask equipped with a stirrer, thermometer, gas addition tube and pH electrodes, was charged with 15 liters of 95 percent ethyl alcohol. Sulfur dioxide (40 moles) was dissolved in the alcohol and ammonia added until the pH of the alcoholic solution was 3.6. Propionaldehyde, 1850 milliliters (25.7 moles), was added at a rate sufficient to maintain the temperature between 30° and 35° C. As the pH of the medium was lowered as the reaction progressed, additional ammonia was added to bring the pH to 3.2. Pure, crystalline material precipitated from the reaction solution and the crystals were separated by filtration. 1-amino-1-propanesulfonic acid was thus obtained in a yield of 90 percent of theoretical.

EXAMPLE II

Preparation of N-methyl-1-amino-1-propanesulfonic acid

Following the procedure of Example I, 5 moles of sulfur dioxide were dissolved in 1500 milliliters of 95 percent ethyl alcohol and 3 moles of methyl amine were added as a 40 percent aqueous solution. After addition of 3 moles of propionaldehyde and removal of excess solvent had been completed, the N-methyl-1-amino-1-propanesulfonic acid was obtained as a crystalline white solid in a yield of 60 percent of theoretical.

EXAMPLE III

Preparation of 1-amino-3-methyl-1-hexanesulfonic acid

Following the procedure of Example I, the reaction of 0.63 mole sulfur dioxide, 0.52 mole ammonia, and 0.36 mole of 3-methyl hexanal in 95 percent alcohol at 50–60° C. for one hour yielded 83 percent of theoretical of 1-amino-3-methyl-1-hexanesulfonic acid as a white crystalline solid.

In a manner similar to the above examples, the reaction of hexanal with dibutylamine and sulfur dioxide in aqueous alcohol yields N-dibutyl-1-amino-1-hexanesulfonic acid; the reaction of decanal with propylamine and sulfur dioxide in aqueous alcohol yields N-propyl-1-amino-1-decanesulfonic acid; the reaction of dodecanal with dipropylamine and sulfur dioxide in aqueous alcohol yields N-dipropyl-1-amino-1-dodecanesulfonic acid; the reaction of undecanal with methylamine and sulfur dioxide in aqueous alcohol yields N-methyl-1-amino-1-undecanesulfonic acid; the reaction of isobutyraldehyde with ammonia and sulfur dioxide in aqueous alcohol yields 1-amino-1-isobutanesulfonic acid; and the reaction of isovaleraldehyde with diethylamine and sulfur dioxide in aqueous alcohol yields N-diethyl-1-amino-1-isopentanesulfonic acid, etc.

Various modifications may be made in the present invention without departing from the spirit or scope thereof, and it is to be understood that we limit ourselves only as defined in the appended claims.

What is claimed is:

1. The process of preparing 1-amino-1-propanesulfonic acid which includes contacting propionaldehyde and a stoichiometric excess of ammonia with a stoichiometric excess of sulfur dioxide, in solution with an alkyl alcohol containing from 1 to 3 carbon atoms inclusive, and containing from about 10 to about 1 percent of water, at a pH from about 2 to about 6, and at a temperature from about 0° C. to about 90° C.

2. The process of preparing 1-amino-1-propanesulfonic acid which includes contacting propionaldehyde and a stoichiometric excess of ammonia with a stoichiometric excess of sulfur dioxide, in solution with an alkyl alcohol containing from 1 to 3 carbon atoms inclusive, and containing from about 10 to about 1 percent of water, at a pH from about 2 to about 6, and at a temperature of about 35° C.

3. The process of preparing 1-amino-1-propanesulfonic acid which includes contacting propionaldehyde and a stoichiometric excess of ammonia with a stoichiometric excess of sulfur dioxide, in solution with an alkyl alcohol containing from 1 to 3 carbon atoms inclusive, and containing from about 10 to about 1 percent of water, at a pH from about 3.0 to about 4.0 and at a temperature of about 35° C.

4. The process of preparing 1-amino-1-propanesulfonic acid which includes contacting propionaldehyde and a stoichiometric excess of ammonia with a stoichiometric excess of sulfur dioxide in 95 percent ethyl alcohol, at a pH from about 3.0 to about 4.0 and at a temperature of about 35° C., and separating the 1-amino-1-propanesulfonic acid from the reaction mixture.

References Cited in the file of this patent

UNITED STATES PATENTS 2,721,875     Dickert et al. _____ Oct. 25, 1955

OTHER REFERENCES

Mendel et al.: "Proc. Soc. Exp. Biol. Med.," vol. 73, pages 541–2 (1950).